UNITED STATES PATENT OFFICE.

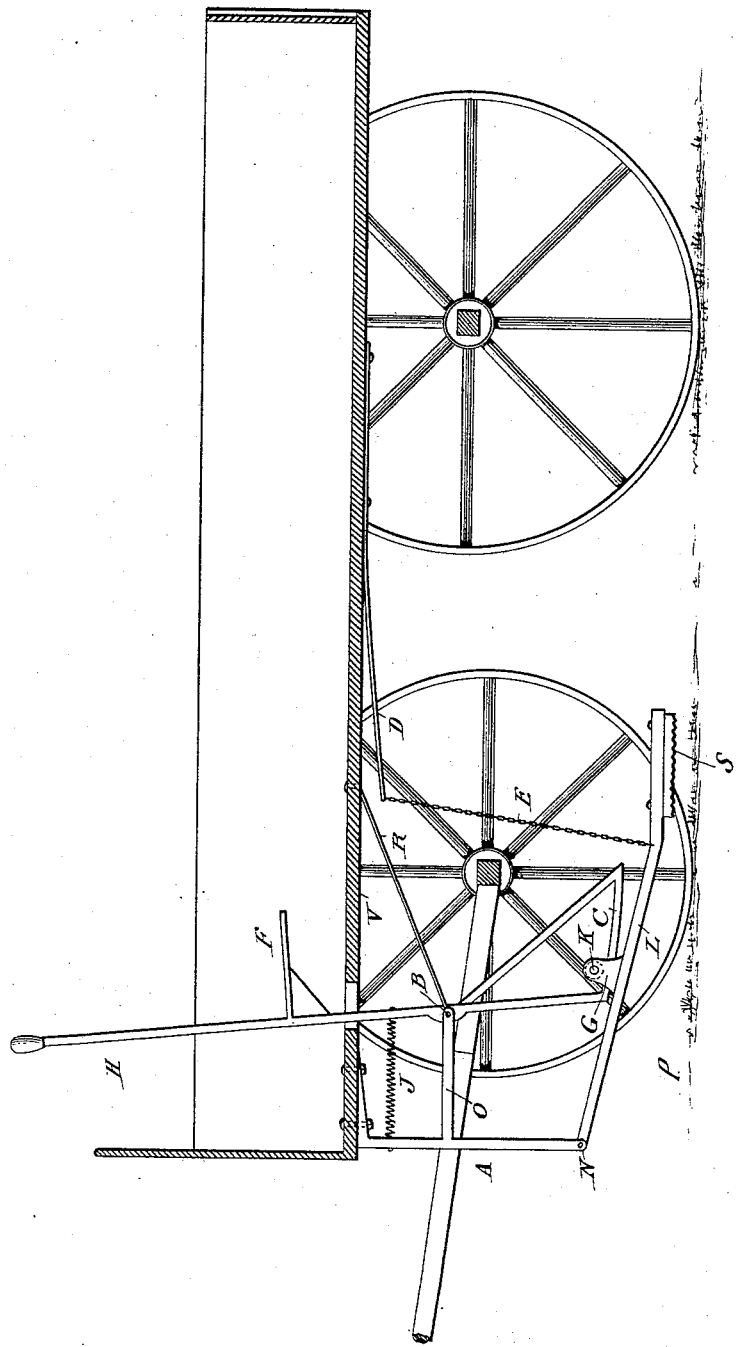

JOHN MÜLLER, OF ROCHESTER, NEW YORK.

BRAKE.

SPECIFICATION forming part of Letters Patent No. 347,501, dated August 17, 188,

Application filed April 16, 1886. Serial No. 199,144. (No model.)

*To all whom it may concern:*

Be it known that I, JOHN MÜLLER, a citizen of the United States, residing in the city of Rochester, county of Monroe, and State of New York, have invented a new and useful Improvement in Brakes, of which the following is a specification.

In nearly all former devices for checking and arresting the motion of vehicles the result has been sought to be accomplished by checking the rotation of the wheels upon which the vehicle is mounted, or stopping the rotation of the wheels entirely, so as to cause them to slide upon the track or road-bed over which the vehicle is passing. This method of checking or arresting the motion of a vehicle has many objections, among which are the following: First, it strains the wheels and axles and all the mechanism connected with them; second, it wears the periphery of the wheel unevenly and soon causes it to lose its perfectly-circular form, thus causing the wheel to impart a jolting motion to the vehicle even when passing over a smooth track; third, upon steep grades, and where the track is in a slippery condition, as when it is wet or covered with snow or ice, stopping the rotation of the wheels is often ineffectual to stop the vehicle because of the sliding of the wheels upon the track; fourth, nearly all such devices require a more or less expensive combination of chains, rods, levers, bars, blocks, and rubbers, which are easily broken or thrown out of adjustment.

I am aware that a rest with a shoe attached has heretofore been applied to the under side of the forward end of "an ordinary tilting cart or dray" in such manner that the combined action of a lever and the cart-wheel will draw the lower part of the rest forward sufficiently to support the weight and keep the body and shafts of the cart in a horizontal position, and thus obviate the difficulty of having the whole weight thrown upon the horse's back, which device incidentally and imperfectly operates as a brake to check the speed of the cart; but in this device the rest and shoe must be lifted from the ground by a reverse motion of the actuating hand-lever, and are sustained when not in use by fastening said lever. I am also aware that a drag has been heretofore attached to the under side of carriages in such manner that by turning a winch and spindle the drag, by the action of a worm, will be screwed down so as to come in contact with the ground, and by its friction therewith retard the motion of the carriage; but in this device the brake, by reason of being pressed against the ground by the action of a worm upon a spindle, is not sufficiently adjustable to the inequalities of the road-bed, and in this device, also, the drag must be lifted from the ground by a reverse motion of the actuating winch and spindle, and is sustained, when not in use by retaining the actuating winch and spindle in position. In both of these devices the part which acts as a brake must be lifted from the ground by a reverse action of the mechanism by which it is lowered against the ground, and when not in use is sustained by the same mechanism.

The object of my invention is to easily and quickly check or arrest the motion of the vehicle by means of a device such as to avoid the above objections. I attain this object by applying the brake-shoe to the pavement or road-bed over which the vehicle is passing, so as to cause friction therewith, instead of applying the brake-shoe to the periphery of the wheels of the vehicle, and also by providing a spring or balance or other mechanical equivalent, such as to withdraw the brake from the pavement when the pressure upon the actuating mechanism is released, and sustain the brake when not in use, and this I accomplish in the following manner: I construct the shoe of either wood, iron, or other material, according to the nature and condition of the pavement or road-bed over which it is to be used, and also construct it with either a smooth, corrugated, or pointed surface, according to the nature and condition of such pavement or road-bed, and according to the season of the year in which it is to be used. This shoe I attach to the brake in such manner that when worn it may be readily replaced by a new one, and so that a shoe with a different surface may be readily substituted when required by the changed condition of the road-bed or pavement. This brake I locate under the vehicle, and connect it with the vehicle and with a lever which may be operated either by hand or foot or other power, so as to press the shoe against the pavement or road-bed and produce friction therewith sufficient to check or arrest the motion of the vehicle. I also connect the brake-block with the vehicle, by means of a spring or balance, in such manner as to lift and sustain the shoe at a convenient distance above the pavement or road-bed when the brake is not in use, and which will permit it to be depressed and brought in contact with the pavement or road-bed by the action of the hand or foot lever or other power when it is desired to check or arrest the motion of the vehicle.

The accompanying drawing shows a longitudinal vertical section, in which V represents the under part of a vehicle; P, the pavement or road-bed over which it passes; A, the stationary arm attached to the under side of the vehicle, at its forward end; O, an offset or branch of the stationary arm; L, the brake-lever, which has its fulcrum at its forward end, N, where it is hinged to the stationary arm A; S, the shoe, which is attached to the rear end of the brake-lever L.

H represents the lever by which the brake is operated by hand, having its fulcrum at the bearing B, where it is pivoted to the offset O of the stationary arm A, and F the spur by which this lever is operated by the foot, either a backward motion of the hand-lever or a downward motion of the foot spur operating to press forward the cam-shaped portion C of this lever, and thus press downward the brake-lever L and shoe S, and a forward motion of the hand-lever operating to lift the brake-lever and shoe, as hereinafter explained. Guides G are attached to the sides of the brake-lever L, between which the cam-shaped portion C slides backward and forward. Between the upper ends of these guides a small roller, K, is placed immediately over the cam-shaped part C. These guides and roller retain the brake-lever L and cam-shaped part C in proper relation with each other, and serve to lift the brake-lever when the hand-lever is thrown forward.

D represents a spring, which also operates to lift the brake-lever and shoe, and sustain them when not in use, through the intervention of the chain E.

J represents a spring which operates to throw the hand-lever forward and sustain it in that position when the brake is not in use. This spring J may be made strong enough to also lift and sustain the brake-lever and shoe through the intervention of the hand-lever, or the spring D may be made strong enough both to lift the brake-lever and shoe and to throw forward the hand-lever by the upward pressure of the brake-lever upon the cam-shaped part C; or the two springs may be made lighter and operate together.

R R' are rods or braces attached at their forward ends to the offset O, and extending backward and outward and attached to the sides of the vehicle, so as to firmly brace the stationary arm and offset.

I do not claim, broadly, a brake suspended under a vehicle, and mechanism by which it may be lowered and raised; but, Having fully described my invention, what I desire to claim, and secure by Letters Patent, is—

1. The brake suspended under the vehicle and capable of being depressed against the road-bed, in combination with the lever by which the brake may be depressed, and the spring by which the brake may be lifted and sustained, substantially as and for the purposes shown and described.

2. The combination of the brake-lever L and shoe S, suspended under the vehicle and capable of being depressed against the road-bed, and the hand-lever H and foot-spur F, by which the brake-lever may be depressed, and the spring D, by which the brake-lever and shoe may be lifted and sustained, operating together, substantially as and for the purpose shown and described.

3. The combination of the brake-lever L and shoe S, suspended under the vehicle and capable of being depressed against the road-bed, and the hand lever H, foot-spur F, guides G, and roller K, by which the brake-lever and shoe may be depressed and raised, and the spring J, capable of drawing forward the hand-lever, and thus lifting and sustaining the brake-lever and shoe, operating together, substantially as and for the purposes shown and described.

JOHN MÜLLER.

Witnesses:
HENRY W. CONKLIN,
I. H. CHILD.